United States Patent Office 3,252,947
Patented May 24, 1966

3,252,947
INTERPOLYMERS OF ISOBUTYLENE, DIALKYL FUMARATES AND ALIPHATIC HYDROCARBON 1,3-DIENES
Robert J. Slocombe, Kirkwood, Mo., and Ronald H. Dahms, Springfield, Mass., assignors to Monsanto Company, St. Louis, Mo., a corporation of Delaware
No Drawing. Filed Mar. 14, 1963, Ser. No. 265,052
10 Claims. (Cl. 260—78.5)

This invention relates to the preparation of novel interpolymers of isobutylene, fumaric diesters, and aliphatic conjugated dienes.

It is known that isobutylene copolymerizes well with fumaric diesters. The di-n-butyl fumarate for example gives a copolymer in high conversion. This material has good aging stability and is soft and flexible but has poor elongation recovery, low wet strength, and other properties which are undesirable.

An object of this invention is to provide isobutylene/fumaric diester resins which have improved properties.

More specific objects are to provide polymeric compositions having utility as textile resins and processes for their preparation.

A particular object is to provide isobutylene/fumaric diester/aliphatic hydrocarbon 1,3-diene interpolymers.

Still other objects and advantages will be apparent in the following description.

The objects of this invention have been obtained in the discovery that certain aliphatic hydrocarbon 1,3-dienes, when polymerized with isobutylene and suitable fumaric diesters, form interpolymers which have faster recovery from elongation, greater wet strength, better low temperature flexibility, and better solvent resistance than the isobutylene/fumaric diester copolymeric system.

Obtaining favorably modified products by including a third component to the isobutylene/fumaric diester system was totally unexpected. Methyl methacrylate or methacrylic acid gives high conversion interpolymers but with increased hardness. Other common monomers such as styrene and acrylonitrile produces interpolymers which have reduced tack and other undesirable properties.

Thus it appears that certain conjugated hydrocarbon dienes, when used in specified concentrations, are unique in producing interpolymers having overall desirable properties.

The isobutylene/di-n-butyl fumarate/1,3-butadiene interpolymer prepared by emulsion polymerization is described in detail below only to show a specific embodiment and is not intended to limit the scope of this invention. Other fumaric diesters and/or aliphatic hydrocarbon 1,3-dienes are also included within the present invention as well as other polymerization methods.

Suitable fumaric diesters can be prepared from both the lower, straight and branched-chain, monohydric alcohols, however the straight-chain alcohols are preferred. Suitable alcohols usually have no more than eight carbon atoms and preferably four or less. Both ester groups are usually the same (i.e., esterified with the same alcohol) but may differ (i.e., be esterified with different alcohols).

A particularly suitable fumaric diester is di-n-butyl fumarate. Other suitable fumarates are dimethyl fumarate, methyl ethyl fumarate, diethyl fumarate, di-n-propyl fumarate, di-isopropyl fumarate, methyl n-butyl fumarate, di-s-butyl fumarate, di-t-butyl fumarate, etc.

The aliphatic hydrocarbon 1,3-dienes employed in this invention are the conjugated dienes, such as 1,3-butadiene and its homologues and derivatives. Substituents may be one or more methyl, ethyl or other lower alkyl radical and located at any position. However polymerization proceeds best when the terminal methylene group is unsubstituted or at most has only one substituent. These dienes usually have no more than ten carbon atoms (including substituents) and preferably no more than six.

Other examples of suitable hydrocarbon 1,3-dienes are 2-methyl-1,3-butadiene, 2,3-dimethyl-1,3-butadiene, 1,3-pentadiene, 2-methyl-1,3-pentadiene, 2,3-dimethyl-1,3-pentadiene, 1,3-hexadiene, etc.

Conversions to the interpolymers vary widely depending on the polymerization conditions. Mass, dispersion, solution, or emulsion polymerization methods can be used. The last mentioned method has the advantages that the interpolymer is usually prepared in high molecular weight and is obtained in a latex form which is easy to handle and convenient for some applications.

Whatever polymerization method is followed, the monomer charge comprises (1) isobutylene in 20–60 percent and preferably in 30–50 percent by weight, (2) the fumarate diester in 30–70 percent and preferably in 40–60 percent by weight, and (3) the aliphatic hydrocarbon conjugated diene in 5–45 percent and preferably in 5–25 percent by weight, all weights based on total monomer.

The polymerization is catalyzed by free radicals produced either by decomposing molecules by heat, light, ionizing radiation, etc., or formed in the course of a chemical reaction. Typical cases of free-radical-forming catalysts (initiators) are molecular oxygen, peroxides (acetyl, benzoyl, or dicumyl peroxide); hydroperoxides (e.g., cumene hydroperoxide); peresters (e.g., potassium persulfate or t-butyl peracetate); and azo compounds (e.g., azo-bis-isobutyronitrile).

The catalytic concentration has little effect on conversion and can be varied over a wide range so long as used in an amount sufficient to initiate and maintain the polymerization. In general this requires that the catalyst be used in about 0.10–10.0 weight percent, based on total monomer.

In emulsion polymerization the use of an emulsifying agent generally gives better conversion rates than when no agent is included. Suitable emulsifying agents include but are not limited to the following examples: Triton X-770 (Na salt of an alkylaryl polyether sulfate), Triton X-100 (alkylaryl polyether alcohol), Aerosol OT (sodium dioctyl sulfosuccinate), Duponol ME (sodium lauryl sulfate), RR Soap (sodium fatty acid), and Nacconol NRSF (sodium alkylaryl sulfonate salt-free).

Persons skilled in the art can readily determine the most effective concentration range for using any particular emulsifying agent. Usually a good emulsion can be prepared when the emulsifying agent is present in 1.0–5.0 weight percent, based on total monomer, but 0.10—10.0 weight percent may be used when a weaker or stronger emulsion is desired.

As a rule satisfactory results are obtained without deliberate pH control. In such cases the pH usually varies from about 5 to 11 initially to about 1 to 6 on concluding the reaction. In a preferred procedure the pH is maintained about 4 to 9 throughout the polymerization.

The ratio of the mixture of the polymerizable monomers (emulsified phase) to the water (emulsifying phase) may be varied widely. Satisfactory results are obtained by using about 100 parts of monomer mixture to about 100 to 500 or more parts of the dispersing phase.

Auxiliary organic solvents such as dioxane, ethyl alcohol, glycols, benzene, etc., when employed either with or without emulsifying agents often give better emulsions.

In any of the above polymerization methods the reaction is generally carried out at +50° C. to +100° C., however, higher or lower temperatures can be used, for instance, from about −50° C. to about +250° C.

The polymerizations are performed within a few hours to several days depending on the ingredients, amount of catalyst, temperature, etc. As a general rule reaction is substantially complete within 12 to 24 hours.

The interpolymer of this invention is found by analysis of the interpolymer to be comprised of (1) isobutylene in 5–35 percent and usually in 10–20 percent by weight, (2) the fumaric diester in 55–85 percent and usually in 65–75 percent by weight, and (3) the aliphatic hydrocarbon conjugated diene in 5–35 percent and usually in 10–20 percent by weight, all weights being based on the interpolymer.

These interpolymers are of the nature of ductile synthetic resinous compositions suitable for many uses in the textile industry such as textile fibers (including but not limited to non-woven fabric), backcoating (carpet, upholstery, etc.), fabric sizing, finishing, warp sizing, coating, textile printing, pigment dyeing, and cord dip.

The isobutylene/fumaric diester/aliphatic hydrocarbon 1,3-diene interpolymers are capable of being vulcanized in the usual fashion to yield rubbery cured compositions with increased heat and solvent resistance, and reduced tack.

The interpolymers of the present invention may be compounded or blended with other resinous materials such as polyethylene, polypropylene, polyvinylacetate, etc., giving new polyblends. Other combinations, modifications, and uses will be apparent to persons skilled in the art.

In order to better describe the present invention the following example is given.

EXAMPLE

For convenience "IB," "DBF," and "BD" will be used to represent isobutylene, di-n-butyl fumarate, and 1,3-butadiene respectively.

Polymerization is performed in heavy glass bottles which are charged with 50 to 150 g. of distilled water followed by DBF, an emulsifying agent, and an initiator in the amounts shown in Table 1. IB and BD are introduced (see Table 1 for amounts) and the bottles are sealed under nitrogen. The reactors are rotated at 60° C. for 18–22 hrs. On completion the contents are cooled and vented to give polymeric residues which are cooled and dried. Conversions [1] are given in Table 1.

*Table 1*

| Monomers, g, IB/DBF/BD | Emulsifying Agent, g. | Initiator, g. | pH Initial | pH Final | Conversion, percent [1] |
|---|---|---|---|---|---|
| 25/15/5 | Duponol ME, 1.150 | $K_2S_2O_8$, 0.225 | 5 | 2 | 80 |
| 25/15/5 | RR Soap, 1.150 | $K_2S_2O_8$, 0.225 | 9 | 6 | 73 |
| 25/15/5 | Nacconol, 1.150 | $K_2S_2O_8$, 0.225 | 5 | 2 | 69 |
| 25/15/5 | Triton X-770, 0.575 and Triton X-100, 0.575 | $K_2S_2O_8$, 0.225 | 7 | 2 | 79 |
| 25/15/5 | Aerosol OT, 1.150 | $K_2S_2O_8$, 0.225 | 7 | 2 | 81 |
| 25/15/5 | do | $K_2S_2O_8$, 0.225 [2] | | | 82 |
| 25/15/5 | do | $K_2S_2O_8$, 0.225 [3] | | | 94 |
| 25/15/5 | do | $K_2S_2O_8$, 0.225 [4] | | | 78 |
| 460/800/160 [5] | Aerosol OT, 36.8 | $K_2S_2O_8$, 7.2 | 7 | 2 | 79 |

[1] Conversions are calculated on the assumption that all of the DBF, BD, and an equimolar amount of IB with respect to the DBF, comprises a 100% conversion to interpolymer.

[2] Methyl methacrylate (3.0 g.) and $K_2S_2O_8$ (0.05 g.) are added as a scavenger system for residual monomer after 20 hrs. after which heating is continued for an additional 6 hrs.

[3] Methyl methacrylate (6.0 g.) and $K_2S_2O_8$ (0.10 g.) are added as a scavenger system for residual monomer after 20 hrs. after which heating is continued for an additional 6 hrs.

[4] Only $K_2S_2O_8$ (0.5 g.) is added after 20 hrs. to the system after which heating is continued for an additional 6 hrs.

[5] 2,370 g. of water is used—reaction is run in a top-stirred 2-gal. autoclave.

Suitable crosslinking agents are isoprene, vinyl crotonate, vinyl acrylate, vinyl allyl ether, diallyl maleate, N,N-methylenebisacrylamide, triallyl cyanurate, diallyl cyanamide, trimethallyl isocyanate, divinyl sulfone, ethylene diacrylate, bicycloheptadiene, triallyl isocyanurate, glycol dimethacrylate, etc.

The compatibility of these new interpolymers with common plasticizers is good. Both solid and liquid plasticizers can be used, including resinous and hydrocarbon types. Some specific examples are n-butyl laurate, methyl hydroxystearate, n-butyl oleate, dimethyl phthalate, diphenyl phthalate, di-isobutyl adipate, triacetin, castor oil, tributyl phosphate, toluenesulfonamide, o-nitro biphenyl, camphor, coal tar oils, etc.

Also fillers, reinforcing agents, diluents, pigments, dyes, softeners, and the like can be used as additives. Some specific examples are as follows: wood flour, cotton flock, mica, asbestos, silica, powdered quartz, lignocellulose, magnesium oxide, clay, limestone, etc.

The fundamental resins of this invention can obviously be modified by including other polymerizable monomers in the charge. For example, along with the isobutylene, the fumaric diester, and the aliphatic 1,3-diene one or more other monomers such as a vinyl halide (e.g., vinyl chloride), an vinylidene halide (e.g., vinylidene chloride), an ester of acrylic acid (e.g., methyl acrylate), an aryl ethylene (e.g., styrene), a vinyl ester (e.g., vinyl acetate), a nitrile derivative of acrylic and methacrylic acid (e.g., acrylonitrile), etc., can be included to give new resins.

Clash-Berg modulus data [2] for the IB/DBF/BD interpolymer is determined by standard procedure (see Ind. Eng. Chem. Anal. Ed., 34, 1218 (1942)), and comparison is made with the IB/DBF system in Table 2.

*Table 2*

| Polymer | $T_f$, °C. | $T_{2,000}$, °C. | S. R. | 25° C. Modulus, p.s.i. |
|---|---|---|---|---|
| IB/DBF/BD | −46 | −19 | 27 | 750 |
| IB/DBF | −14 | +18 | 32 | 1,000 |

What is claimed is:

1. A process for preparing isobutylene/fumaric diester/aliphatic hydrocarbon 1,3-diene interpolymers which comprises polymerizing in the presence of a free-radical-form-

[1] Analysis for residual monomers by vapor phase chromatography shows only IB which indicates that all the DBF and BD have gone into the interpolymer. From the weight of unreacted IB and the weight of monomers in the charge, the polymeric composition can be calculated. This value as determined for a typical IB/DBF/BD interpolymer is 12%/IB, 70%/DBF, and 17%/BD.

[2] The Clash-Berg modulus data gives information of the torsional stiffness of the polymer as related to temperature. The $T_f$ value is the temperature at which the polymer just begins to have some slight degree of flexibility. The $T_{2,000}$ value is the temperature at which the material becomes very rubbery and non-load bearing. The Stifflex range ($T_f - T_{2,000}$) represents the temperature range over which the polymer is reasonably tough, i.e., high in impact strength, and at the same time rigid enough to bear some load. The value of the 25° C. modulus is determined to provide indication of the torsional modulus at approximately room temperature.

ing catalyst monomers comprising in amounts limited to a total of 100% by weight (1) isobutylene in 20–60 weight percent, (2) a dialkyl fumarate in which the alkyl groups are lower alkyl in 30–70 weight percent, and (3) an aliphatic hydrocarbon 1,3-diene of no more than ten carbon atoms in 5–45 weight percent, all weights based on total monomer.

2. A process for preparing isobutylene/fumaric diester/aliphatic hydrocarbon 1,3-diene interpolymers which comprises polymerizing in the presence of a free-radical-forming catalyst monomers comprising in amounts limited to a total of 100% by weight (1) isobutylene in 30–50 weight percent, (2) a dialkyl fumarate in which the alkyl groups are lower alkyl in 40–60 weight percent, and (3) an aliphatic hydrocarbon 1,3-diene of no more than six carbon atoms in 5–25 weight percent, all weights based on total monomer.

3. A process for preparing isobutylene/di-n-butyl fumarate/1,3-butadiene interpolymers which comprises polymerizing in the presence of a free-radical-forming catalyst monomers comprising in amounts limited to a total of 100% by weight (1) isobutylene in 20–60 weight percent, (2) di-n-butyl fumarate in 30–70 weight percent, and (3) 1,3-butadiene in 5.45 weight percent, all weights based on total monomer.

4. A process for preparing isobutylene/di-n-butyl fumarate/1,3-butadiene interpolymers which comprises polymerizing in the presence of a free-radical-forming catalyst monomers comprising in amounts limited to a total of 100% by weight (1) isobutylene in 30–50 weight percent, (2) di-n-butyl fumarate in 40–60 weight percent, and (3) 1,3-butadiene in 5–25 weight percent, all weights based on total monomer.

5. An interpolymer of isobutylene, a fumaric diester, and an aliphatic hydrocarbon 1,3-diene comprised in amounts limited to a total of 100% by weight of (1) isobutylene in 5–35 weight percent, (2) dialkyl fumarate in which the alkyl groups are lower alkyl in 55–85 weight percent, and (3) aliphatic hydrocarbon 1,3-diene of no more than ten carbon atoms in 5–35 weight percent, all weights based on the interpolymer, said interpolymer being produced by free-radical catalyzed polymerization of the foregoing monomers in admixture.

6. An interpolymer of isobutylene, a fumaric diester, and an aliphatic hydrocarbon 1,3-diene comprised in amounts limited to a total of 100% by weight of (1) isobutylene in 10–20 weight percent, (2) dialkyl fumarate in which the alkyl groups are lower alkyl in 65–75 weight percent, and (3) aliphatic hydrocarbon 1,3-diene of no more than six carbon atoms in 10–20 weight percent, all weights based on the interpolymer, said interpolymer being produced by free-radical catalyzed polymerization of the foregoing monomers in admixture.

7. An interpolymer of isobutylene, di-n-butyl fumarate, and 1,3-butadiene comprised in amounts limited to a total of 100% by weight of (1) isobutylene in 5–35 weight percent, (2) di-n-butyl fumarate in 55–85 weight percent, and (3) 1,3-butadiene in 5–35 weight percent, all weights based on the interpolymer, said interpolymer being produced by free-radical catalyzed polymerization of the foregoing monomers in admixture.

8. An interpolymer of isobutylene, di-n-butyl fumarate, and 1,3-butadiene comprised in amounts limited to a total of 100% by weight of (1) isobutylene in 10–20 weight percent, (2) di-n-butyl fumarate in 65–75 weight percent, and (3) 1,3-butadiene in 10–20 weight percent, all weights based on the interpolymer, said interpolymer being produced by free-radical catalyzed polymerization of the foregoing monomers in admixture.

9. An interpolymer of isobutylene, a dialkyl fumarate and 1,3-butadiene comprised in amounts limited to a total of 100% by weight of (1) isobutylene in 5–35 weight percent, (2) dialkylfumarate in 55–85 weight percent, and (3) 1,3-butadiene-5 in 5–35 weight percent, all weights based on the interpolymer and in which the alkyl groups in the dialkyl fumarate have 1 to 4 carbon atoms, said interpolymer being produced by free-radical catalyzed polymerization of the foregoing monomers in admixture.

10. The process of claim 4 in which the polymerization is conducted in aqueous emulsion at temperatures of 50 to 100° C.

References Cited by the Examiner
UNITED STATES PATENTS

| | | | |
|---|---|---|---|
| 2,182,316 | 12/1939 | Hopff et al. | 260—78.5 |
| 2,463,571 | 3/1949 | Stanton et al. | 260—80.7 |
| 2,671,074 | 3/1954 | Brown | 260—80.7 |
| 2,789,961 | 4/1957 | Hoelocher | 260—78.5 |
| 3,113,695 | 12/1963 | Bosmajian | 260—80.7 |

JOSEPH L. SCHOFER, *Primary Examiner.*

DONALD E. CZAJA, *Examiner.*